United States Patent
Rabenhorst

[15] 3,682,518
[45] Aug. 8, 1972

[54] MAGNETIC FLUID BEARING

[72] Inventor: David W. Rabenhorst, Silver Springs, Md.

[73] Assignee: The Johns Hopkins University, Baltimore, Md.

[22] Filed: Feb. 18, 1971

[21] Appl. No.: 116,369

[52] U.S. Cl............................................308/168
[51] Int. Cl.............................................F16c 1/24
[58] Field of Search................................308/168, 9

[56] References Cited

UNITED STATES PATENTS 3,530,728   9/1970   Evans et al. ...............308/161

Primary Examiner—Martin P. Schwadron
Assistant Examiner—Frank Susko
Attorney—John S. Lacey

[57] ABSTRACT

The invention comprises several related embodiments of a basic rotary thrust bearing. The present bearings provide stability in three planes, the thrust capability thereof being derived from the compressive reaction of a hermetically sealed fluid held between stationary and rotating thrust plates. Essentially, a stationary thrust plate of the present bearing comprises an annular magnet having concentric magnetically permeable pole members disposed therearound, which pole members have raised bevels at respective ends facing a rotating thrust plate. The rotating thrust plate comprises an annular plate having concentric raised bevels opposing the bevels on the stationary thrust plate, a magnetic fluid being magnetically held between the annular apices of the respective bevels for trapping a fluid within a chamber defined by the bevels.

11 Claims, 14 Drawing Figures

PATENTED AUG 8 1972 3,682,518

INVENTOR.
DAVID W. RABENHORST

INVENTOR.
DAVID W. RABENHORST

INVENTOR.
DAVID W. RABENHORST

INVENTOR.
DAVID W. RABENHORST

MAGNETIC FLUID BEARING

CROSS-REFERENCE TO RELATED APPLICATIONS

The present invention is briefly described in a copending application entitled "Filament Rotor Structures", Ser. No. 60,047, filed July 31, 1970, by the same inventor.

BACKGROUND AND SUMMARY OF THE INVENTION

The invention herein described was made in the course of or under a contract or subcontract thereunder, with the Department of the Navy.

The invention is primarily a passive rotary thrust bearing capable of high speed operation at high axial loading with minimum friction. Various configurations of the invention also exhibit moderate radial loading capability. Generally, the present bearings are often larger and heavier than prior art antifriction bearings having similar load capability if the lubrication and thermal control apparatus associated with most of these prior art bearings is discounted. The present bearings do not ordinarily require such auxiliary apparatus since rotating and stationary solid components of the present bearings are typically separated by at least 0.004 inch. The principal source of heat generated during operation of the present bearings is the "drag" of fluid seals, which seals can be arranged so that generated heat is dissipated through a large radiating surface. The present bearings provide greatest advantage for applications requiring one or more of the following capabilities: long life, low drag, zero vibration, zero stiction, zero audible noise, high speed, immunity to a corrosive environment, minimum deflection, and immunity to a hard vacuum.

The prior art includes a thrust bearing such as is disclosed by Weissman in U. S. Pat. No. 3,235,757, in which a thrust plate member of magnetic material is secured to and rotatable with a rotary element and is disposed in attractive proximity to a stationary thrust plate member also composed of magnetic material. The two thrust plates of Weissman define a spacing between opposing faces, which spacing contains a gas under pressure. The pressurized gas provides a repelling force which is balanced by the attractive force between the magnetically-attracted thrust plate members. In the Weissman patent, thrust plates essentially comprising magnetic structure are used to provide mutually attractive force between the plates in opposition to pressure exerted by a fluid held between said plates. In the present bearings, only one of the thrust plates comprises magnetic structure, which structure is utilized solely for sealing a fluid between the thrust plates, the sealing function being provided by a magnetic fluid under the influence of the magnetic structure. The present bearings do not depend on a precarious "balancing" of forces to remain operative, but may be conveniently "staged" without a geometrically progressive increase in complexity to provide maximum loading capability.

In its most basic form, the present invention comprises a rotating plate member having at least two integral concentric raised bevels on a first face thereof. A stationary plate member oppositely facing the rotating plate member is comprised of an annular ring magnet, flux from which is concentrated by annular concentric pole pieces bordering said magnet. The pole pieces of the stationary plate member have "corrugated" surfaces which are disposed in oppositely facing relation to the concentric bevels of the rotating plate member, the apices of the respective beveled structures being separated by extremely narrow annular gaps. These annular gaps are filled with a ferro-magnetic fluid which, under the influence of the magnetic flux concentrated by the respective beveled structures, seals a chamber formed between the opposing concentric bevels of the rotating plate member and the corrugated surfaces of the pole pieces held on the stationary plate member. A fluid held in this hermetically-sealed chamber provides a pressurized repelling force to resist axial loading imposed on the bearing.

One advantageous feature of the invention is that its axial load capability can be increased not only by increasing the area of the sealed chamber, but also by "staging" the bearing, i.e., by providing in multiple a plurality of the basic bearing units. Thus, the load-carrying capability of the staged bearing would be the summation of the capabilities of the individual basic bearing units.

The seal between the two plate members is formed in concert with the ring magnet and the flux-concentrating beveled structures on the two plate members and comprises a colloidal suspension of extremely fine ($\sim 100$ A) iron oxide particles in a carrier liquid. The suspension remains fluid even under exposure to magnetic saturation or extreme acceleration. The seals may be configured magnetically to be used to seal magnetic or non-magnetic mating surfaces.

Accordingly, a primary object of the invention is to provide rotary thrust bearings which exhibit stability in three planes, the thrust capability thereof being derived from the compressive reaction of a hermetically sealed fluid held between stationary and rotating thrust plates.

Another object of the invention is to provide rotary thrust bearings capable of high speed operation at high axial loading but with minimum friction.

A further object of the invention is to provide a basic thrust bearing unit which may be "staged" to produce a bearing having a greater load-carrying capability without increasing the complexity of the assembly as a whole.

Further objects and attendant advantages of the invention will become more readily apparent in light of the following detailed description of the several embodiments of the invention.

DESCRIPTION OF THE PREFERRED EMBODIMENTS

The invention provides a basic rotary thrust bearing having a number of related embodiments, a principal feature of which embodiments is the entrapment of a fluid between stationary and rotating thrust plates by means of rotary magnetic fluid seals. The invention comprises a novel arrangement of bearing and seal components which produces a high-speed, high-load bearing having virtually no starting friction and an almost unlimited operating lifetime. The several embodiments of the invention each inherently provide varying radial loading and/or sealing capability depending on the specific configuration employed.

Each bearing structure provides magnetic flux concentration between stationary and rotary members which produces a modest radial load capability. The magnitude of the radial capability is proportional to the size and strength of the magnet employed and to the size and number of annular bevellike structures which the magnet can saturate. A sizable radial load capability may generally be provided only where bearing weight is not a limiting consideration.

The present invention encompasses a number of bearing and rotary structures which are related by the common use of a magnetic fluid to at least perform a sealing function, particularly to seal a fluid between thrust plate members of a bearing for a rotating shaft.

Figure 1A:
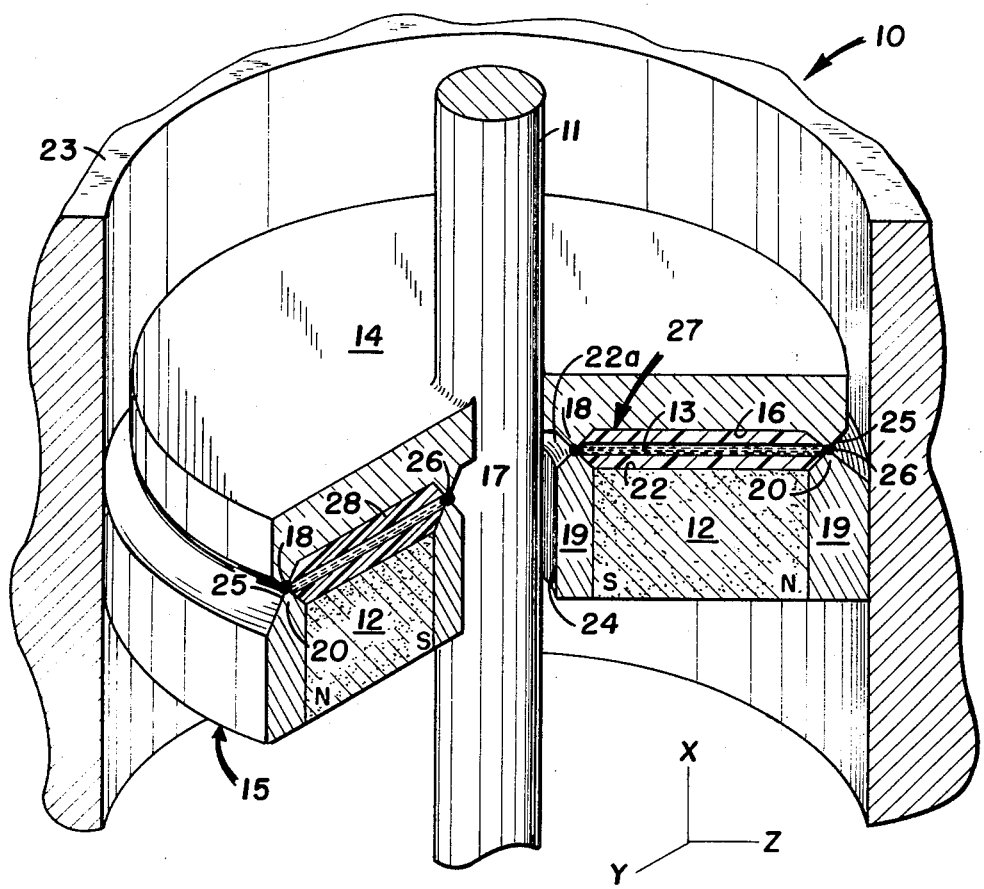
FIG. 1a is a perspective view in partial section of the basic embodiment of the invention.

Referring initially to FIG. 1a, in which the basic configuration of the invention is shown, a bearing structure 10 provides stability in three planes to a rotary shaft 11. The bearing structure 10 is completely passive, avoiding contact between any solid moving component of the structure. Stability in the y and z directions is provided by an annular ring magnet 12, while stability in the x axis is provided by a fluid 13 sealed between rotary and stationary annular thrust plates 14 and 15.

The rotary annular thrust plate 14 is preferably formed integrally with the rotary shaft 11. The plate 14, composed of magnetically permeable material such as iron, has annular shallow recesses 16 and 17 formed on its inner face, the recess 16 being bounded and defined by two raised concentric bevels 18. Each bevel 18 is defined by reversed sloping surfaces which intersect to form an annular edge, or apice, surmounting the ridgelike structure.

The stationary annular thrust plate 15 is substantially comprised of the annular ring magnet 12 which is bounded on its inner and outer perimeters by two concentric annular pole pieces 19. The pole pieces 19 have raised inner annular bevels 20 which taper from the inner face of the magnet 12, thereby defining a shallow annular recess 22 which employs the inner face of the magnet 12 as its floor. The pole pieces 19 and the magnet 12 in combination constitute the stationary thrust plate 15 and are fixed to a stationary support housing 23 which surrounds the perimeter of the outer pole piece 19. The inner pole piece 19 is formed with a circular bore 24 which freely receives a portion of the rotary shaft 11. Positioning of the shaft 11 within the bore 24 in the stationary thrust plate 15, brings the inner faces of the rotary and stationary thrust plates respectively into oppositely facing spaced relation. The annular bevels 18 on the rotary thrust plate 14 directly face and oppose the annular bevels 20 of the stationary thrust plate 15, i.e., the outer bevel 18 has the same annular diameter as the outer bevel 20. Similarly, the inner bevel 18 has the same annular diameter as the inner bevel 20. Annular apices 25 of the bevels 18 and 20 are mutually and respectively spaced apart approximately 0.004 inch, thereby forming a finite annular gap between the two sets of bevels 18 and 20. A magnetizable fluid 26, such as one of the ferromagnetic fluids now commercially available, is held in the finite space comprising the gap by the magnetic influence of the annular magnet 12, which influence, or flux, is concentrated in the gap by the bevels 20 of the pole pieces 19 and by the bevels 18 on the rotary thrust plate 14. Magnetic flux from the magnet 12 finds a continuous path, through the magnetically permeable pole pieces 19 and the rotary thrust plate 14, the flux being concentrated in the gap to cause the magnetic fluid 26 to provide a continuous seal.

The annular recesses 16 and 22 are thus disposed in oppositely facing relation to form an annular chamber 27 defined by the annular bevels 18, the annular bevels 20, and the respective surfaces of the inner faces enclosed by said bevels 18 and 20. The previously mentioned fluid 13 is sealed in the annular chamber 27 by the magnetic fluid 26 as described hereinabove. The chamber 27 may be reduced in volume by the provision of a non-magnetic filler member 28 in each of the annular recesses 16 and 22. The filler members are employed to reduce the amount of fluid required in the chamber 27, thus minimizing bearing deflection where the fluid 13 is a compressable gas.

The fluid 13 within the annular chamber 27 may be trapped and held at moderate pressure for indefinite periods. An operable bearing, such as the structure 10, typically seals a .005 inch gap of air at pressures near 3 psig within the chamber 27. The present invention is particularly directed to the advantageous modification and "staging" of the basic configuration shown in FIG. 1a and described above. Provision of a plurality of the chambers 27 each formed in the manner described allows scalable staging to produce a bearing structure having a desired loading capability.

Figure 1B:
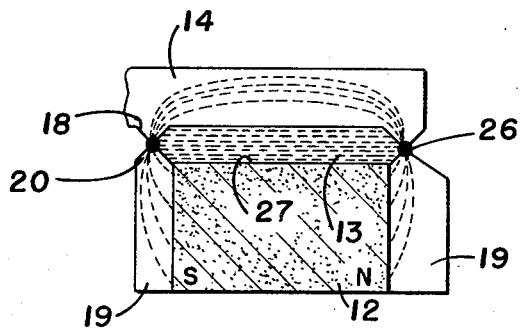
FIG. 1b is a schematic illustrating the magnetic seal used in all embodiments of the invention.

FIG. 1b schematically illustrates the operation of the magnetic seal formed by the magnetic fluid 26, the pole pieces 19, and the magnet 12. As seen in the schematic representation of a section of a half portion of the bearing 10, lines of magnetic flux, shown by the broken lines in the Figure, emanate from the magnet 12 and pass through the "magnetically conductive" path formed by the pole pieces 19 on either side of the magnet 12 and the rotary thrust plate 14 itself. The bevels 18 and 20 act to concentrate the magnetic flux in the gap therebetween, thereby holding the magnetic fluid 26 therein to hermetically seal the chamber 27 containing the fluid 13.

Figure 2:
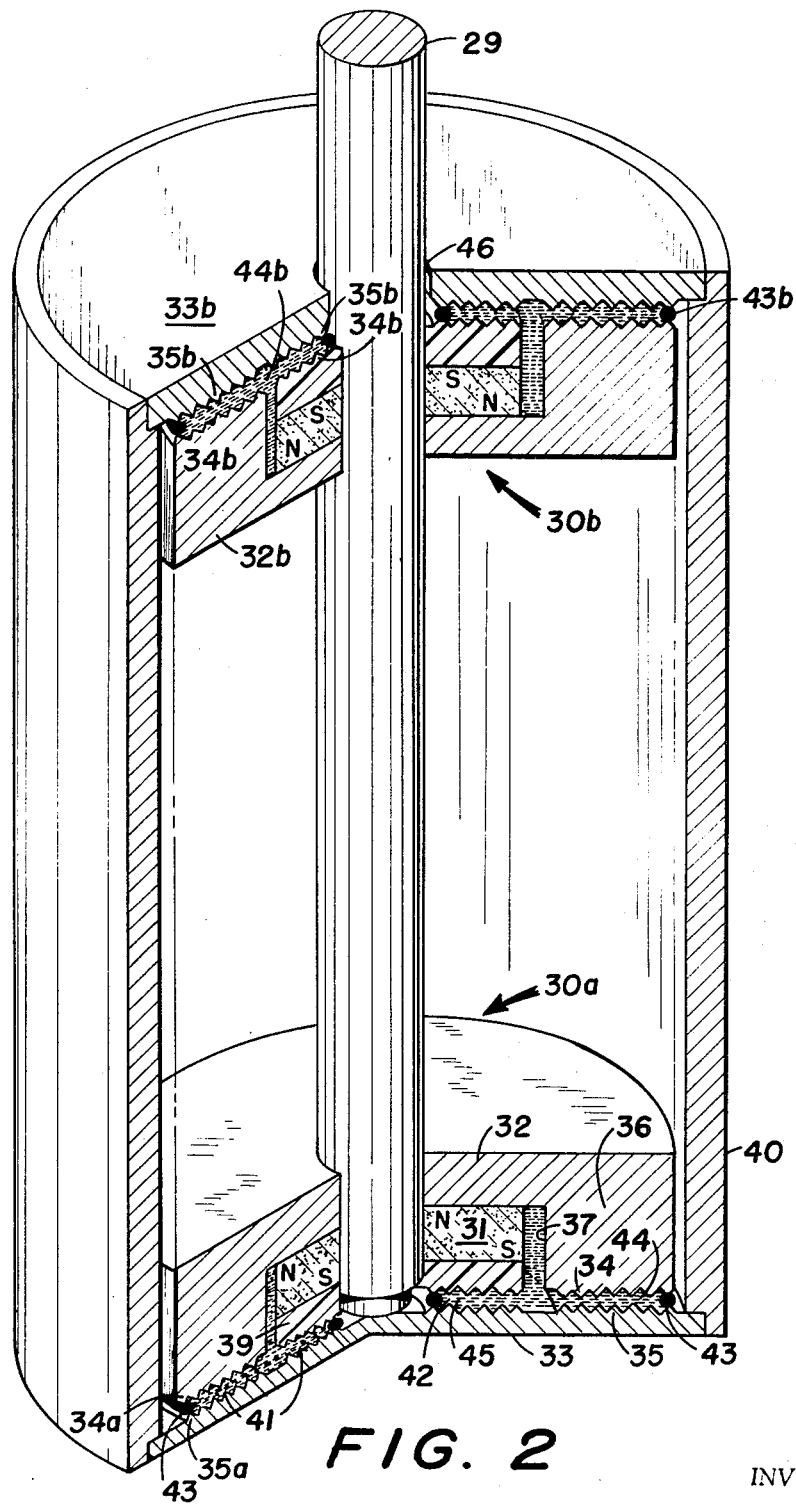
FIG. 2 is a perspective view in partial section of a bearing pair wherein the annular magnet employed is carried on the rotating thrust plate.

As seen in FIG. 2, the bearings of the invention are arranged in opposed pairs in order to maintain axial and cocking stability. In particular, a non-magnetic rotary shaft 29 is provided with oppositely facing bearings 30a and 30b at or near the ends of the shaft. Since the bearings 30a and 30b are essentially mirror images, only one of said bearings will be described in detail. The bearing 30a differs from the bearing structure 10 of FIG. 1a in two major respects, i.e., an annular ring magnet 31 of the bearing 30a is carried on an annular rotary thrust plate 32 rather than on a stationary annular thrust plate 33, and a plurality of annular raised bevels 34 and 35 are provided on the plates 32 and 33 respectively for purposes to be described hereinafter.

The rotary thrust plate 32 is formed integrally with the shaft 29 as is described in the case of the basic configuration shown in FIG. 1. The plate 32, however, is provided with a thickened rim 36 which is defined by a circular recess 37 in its lower face. The recess 37 houses the ring magnet 31, the magnet surrounding that portion of the shaft 29 in engagement therewith. An annular pole piece 39 engages the ring magnet 31 within the recess 37. The pole piece 39 and rim 36 are each provided with a plurality of the previously-mentioned annular concentric bevels 34, which bevels, in section, appear as a "saw tooth" pattern across the surface of both said pole piece 39 and the rim 36.

The stationary annular plate 33 is disposed in opposed relation to the rotary plate 32. In the bearing 30a shown, the plate 33 further serves as an end plate for a cylindrical bearing housing 40. The plate 33 is provided with a plurality of the previously-mentioned annular concentric bevels 35 which, by virtue of the oppositely facing relation of the plates 32 and 33, align with the annular bevels 34 on the plate 32. The apices 41 of the bevels 34 and 35 are directly aligned, each pair of said bevels 34 and 35 being respectively separated by a narrow air gap 42. Magnetic flux flows from the magnet 31 through the magnetically permeable plates 32 and 33 and is concentrated in the air gaps 42 by the bevels 34 and 35. Outer bevels 34a and 35a have magnetic fluid 43 disposed therebetween which, under the influence of the magnet 31, seals the space between the plates 32 and 33 to form chamber 44 therebetween. The remaining pairs of bevels 34 and 35 lend radial stability to the bearing 30a due to the plurality of concentrated stabilizing magnetic fields established between each opposing pair of said bevels 34 and 35.

The chamber 44 contains a fluid 45. Movement of the rotary plate 32 toward the stationary plate 33 causes the resultant compression of the fluid 45 to resist movement caused by axial loading imposed on the shaft 29. The chamber 44 would typically contain a few thousandths of a cubic inch of air at a pressure of 3 psig (per seal pair 43). Usually the bearing 30a is assembled at ambient pressure such that, on imposition of the rated axial load, the rated displacement (e.g., ~.001 inch) causes the sealed fluid pressure to rise to its rated pressure to balance the load. Thus, at all times when the bearing 30a is not under load, the fluid 45 does not experience a differential pressure. As previously mentioned, staging of the bearings 30a in a manner to be described hereinafter produces a bearing structure having increased loading capability.

The bearing 30b of FIG. 2 is virtually identical to the bearing 30a already described. However, stationary annular thrust plate 33b is provided with an axially-disposed circular port 46 through which the rotary shaft 29 extends beyond the housing 40. Thus, in the bearing 30b, both outside and inside pairs of bevels 34b and 35b on the respective plates 32b and 33b are provided with magnetic fluid 43b therebetween to seal chamber 44b.

The same components of the bearings 30a and 30b which provide means for maintaining the magnetic fluid 43 and 43b in place to act as a seal, also provide magnetic flux concentration to produce a modest radial load capability. The magnitude of the radial capability is proportional not only to the size and strength of the ring magnet 31, but also to the size and number of pairs of mating bevels 34 and 35 on the plates 32 and 33 which can be saturated by the magnet 31. Large radial loads may thus be accommodated with negligible magnetic losses. Of course, the basic thrust bearing structure 10 of FIG. 1a would exhibit some radial capability through the same bevel-like structures that concentrate magnetic flux for sealing the chamber 27. Radial load capability could alternatively be provided by conventional bearings in a hybrid bearing system (not shown).

Figure 3:
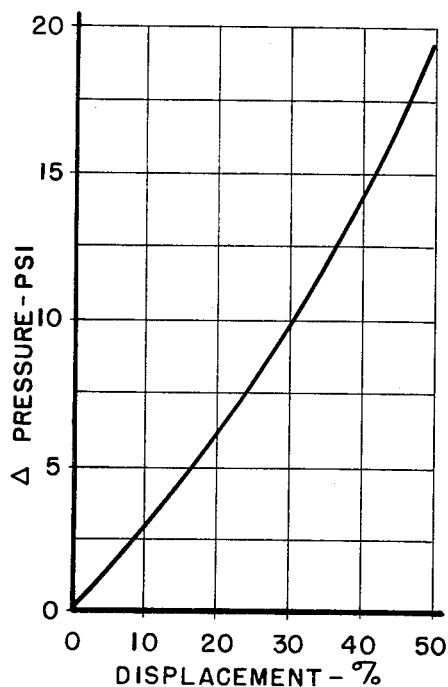
FIG. 3 is a graph illustrating the relationship between the internal chamber pressure and the displacement of the shaft (thus the imposed loading on the shaft)

The pressure within the bearings 30a and 30b varies with displacement of the shaft 29 according to the relationship illustrated in FIG. 3. The curve indicates that a rated chamber pressure of 3 psig would be reached when the shaft 29 is displaced only 10 percent of the total initial chamber gap between the plates 32 and 33. If the operating area, i.e. the area forming each of the "floors" of the chamber 44, of the bearings 30a is 10 square inches, the bearing could support 30 pounds with an axial displacement of 0.005 inches, or 60 pounds at 0.001 inch displacement, assuming an initial chamber gap of 0.005 inches between the plates. If the initial gap is less than this value, the load values are proportionally increased. An initial distance between the plates 32 and 33 of between 0.001 to 0.002 inch permits chamber pressures approaching 15 psig. However, such a configuration would only find practical application in very small bearings.

Figure 4:
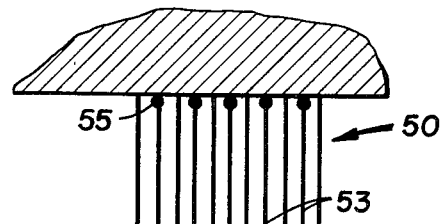
FIG. 4 is a schematic view of a staged bearing having a plurality of individual bearing units structured according to the basic bearing configuration.
Figure 4:
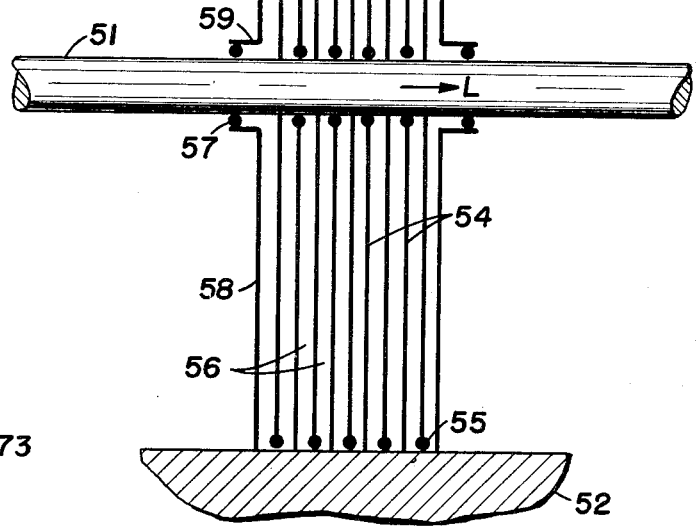

The present invention provides a major advantage in its ability to be scaled or "staged" to additively increase axial capability. FIG. 4 schematically illustrates a staged bearing 50 which comprises a combination in multiple of a plurality of basic bearing units about a rotary shaft 51. The staged bearing 50 conveniently may utilize a gaseous fluid, such as air, as the working fluid. An essentially cylindrical bearing housing 52 has the rotary shaft 51 axially disposed therein. A plurality of rotary thrust plates 53 are formed integrally with and disposed in equally spaced relation on the rotary shaft 51. Similarly, a plurality of stationary thrust plates 54 extend from the interior of the housing 52, the stationary plates 54 being disposed in equally spaced relation from each other and interdigitated in alternating relation to the rotary plates 53. Each of the rotary plates 53 is sealed along its outer perimeter, such as against the inner surface of the housing 52. Similarly, each of the stationary plates 54 is sealed along its inner perimeter, such as against the rotary shaft 51. The sealing function could be accomplished through the use of magnetic seals 55 disposed between the plates 53 and 54 and the housing 52 and shaft 51 respectively. Although not shown in the schematic for simplicity, magnetic flux necessary to hold magnetic fluid in the seals 55 is provided by ring magnets (not shown) on each of the plates 53 and 54. Alternatively, each stationary thrust plate 54 may comprise a ring magnet and annular pole pieces such as is described for the plate 15 of the bearing structure 10 of FIG. 1. However, in this case the pole pieces would be configured to seal on both faces of the stationary plate 54 in cooperation with structure on the opposing faces of the rotary plates 53 on either side of the plate 54. Thus, each stationary plate 54 would maintain a sealed chamber 56 between itself and each of the rotary plates on either side of the stationary plate 54. End seals 57, which may also be comprised of magnetic fluid, seal terminal stationary plates 58, which plates 58 are each provided with an integral annular flange 59 to assure efficient end sealing of the staged bearing 50. All spaces between the rotary and stationary plates 53 and 54 are thus sealed not only from inter-communication but also from ambient conditions.

Application of an axial load to the rotary shaft 51, such as is represented by vector L, causes said shaft 51 and the rotary plates 53 to be biased in the direction of the imposed load L. Considering the loading to be imposed from left to right on the drawing, the pressure in the chambers 56 located directly to the right of each of the rotary plates 53 would be increased, the pressure in the chambers located directly to the left of each of the plates 53 being decreased. The axial load capability of the bearing 50 is thereby found to be the differential pressure of the seals 55 multiplied by both the area of one of the rotary plates 53 and the total number of the plates 53. Thus, if a single seal 55 is rated for 3 psig and each of ten rotary plates 53 have a sealed surface area of 10 square inches, then the bearing 50 could support an axial load of 300 pounds. Alternately, if a single rotary plate 53 were sealed between two terminal stationary plates 58 by means of a single 10-stage magnetic fluid seal on either side of the plate 53, the total axial loading capability would again equal 300 pounds, but the bearing would have ten times the deflection per unit load at the same internal operating pressure. The actual deflection under load is inversely proportional to the internal pressure in the bearing 50. If the internal working pressure of a 10-stage bearing, such as one constructed according to bearing 50, was ambient pressure (~ 15 psia), then a 3 psi differential pressure is obtainable when the displacement of the shaft 51 equals 10 percent of the distance separating the plates 53 and 54. A 10 percent displacement amounts to only 0.001 inch deflection if the plates 53 and 54 are separated by 0.01 inch spaces. The deflection of the magnetic fluid in the seals 55 is insignificant, since the total seal volume is only 1 percent of the volume of sealed fluid within one of the chambers 56. A higher working pressure held by strengthened end seals 57 could reduce displacement under load or could increase the allowable distance between the plates 53 and 54. Radial capability could be incorporated into the bearing 50 as described previously for the bearing 30a of FIG. 2. Alternatively, conventional radial bearings (not shown) could be placed along the shaft 51.

Figure 5B:
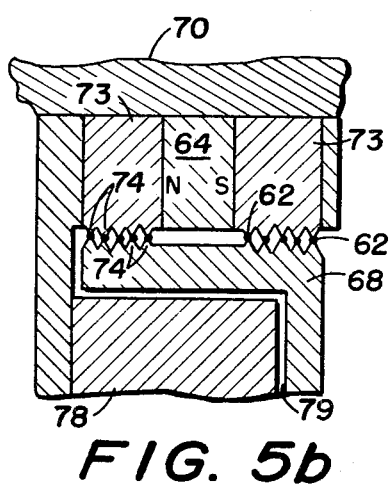
FIG. 5b is an enlarged detail view of a portion of the configuration of FIG. 5a, and particularly illustrating the magnetic seal.
Figure 5A:
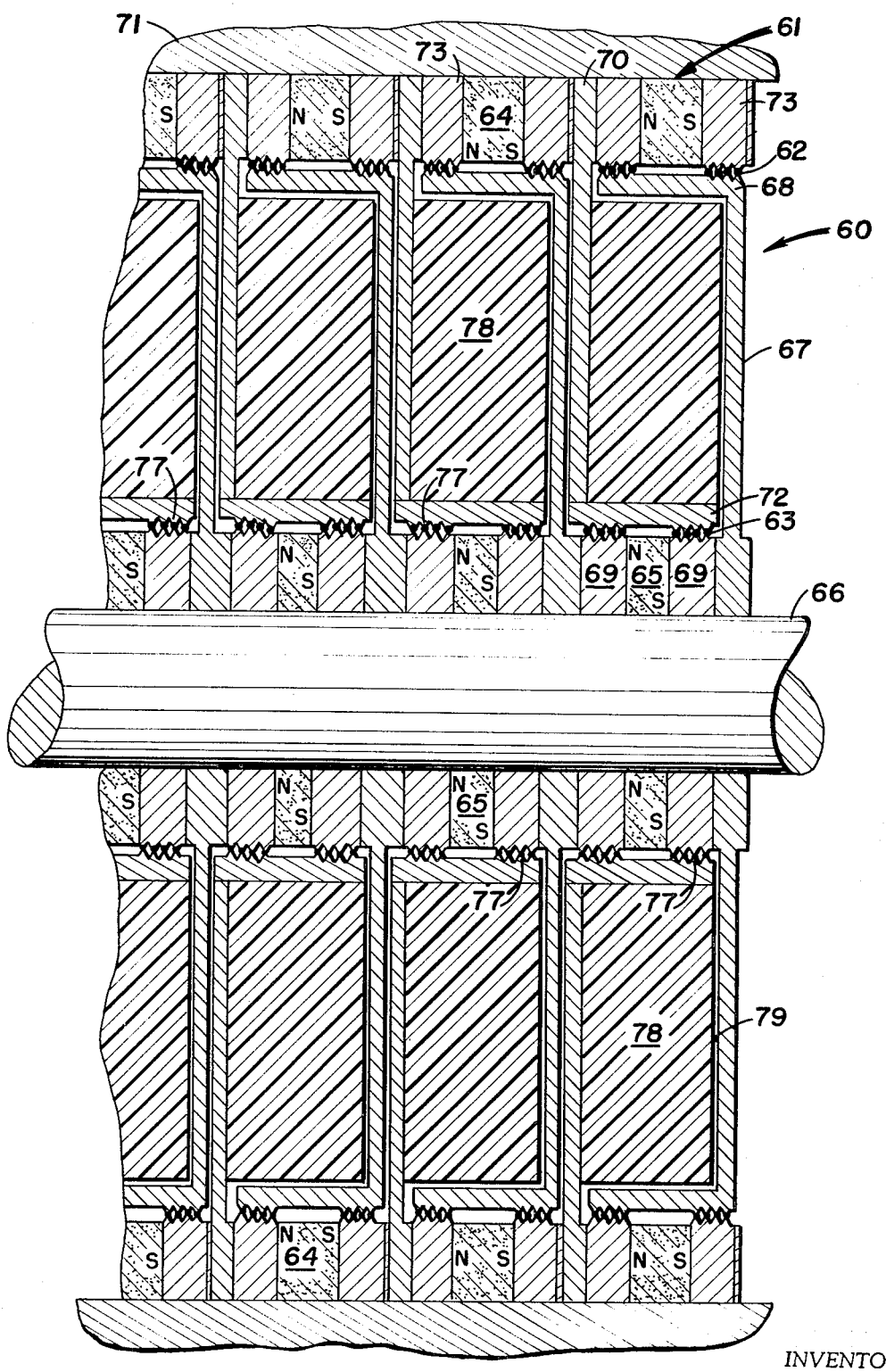
FIG. 5a is a sectional view of a second type of staged bearing configuration.

FIG. 5a shows a staged bearing 60 sealed by providing a plurality of seals on each bearing stage 61, one of which is shown in detail in FIG. 5b. Each stage 61 is provided with a plurality of magnetic seals 62 and 63 comprised of magnetic fluid held under the influence of concentric annular ring magnets 64 and 65. A rotary shaft 66 carries annular rotary thrust plates 67, which plates 67 are formed with flanged outer rims 68. Each stage 61 has one of the ring magnets 65 and associated annular pole pieces 69 disposed contiguous to and circumferentially about the shaft 66, each of the pole pieces 69 being disposed in abutting relation to one of the rotary plates 67. Stationary annular thrust plates 70 extend from bearing housing 71 and have flanged inner rims 72 disposed in lateral proximity to the ring magnet 65. Each stage 61 has one of the ring magnets 64 and associated annular pole pieces 73 attached to the inner periphery of the housing 71, each of the pole pieces 73 being disposed in abutting relation to one of the stationary plates 70.

If only one of the stages of the bearing 60 be viewed, such as in the enlarged end view of a stage 61 shown in FIG. 5b, the rim 68 is seen to be disposed concentrically with and in proximity to the ring magnet 64 and the associated annular pole pieces 73. The rim 68 and the pole pieces 73 are seen to be provided with a plurality of opposed concentric bevels 74 extending from their outer peripheral surfaces. The apices of the opposed bevels 74 are separated by narrow annular spaces. These spaces are filled with magnetic fluid in a manner previously described to form the magnetic seals 62. The seals 63 are similarly formed under the influence of the ring magnet 65, magnetic flux being concentrated by opposed bevels on the inner rim 72 and on the pole pieces 69 to form said seals 63. An annular filler member 78 reduces the volume of chamber 79 formed between the thrust plates 67 and 70, which chamber 79 contains a fluid such as air. Each of the seals 62 and 63 operates at a rated differential pressure, such as 3 psi, to produce an axial capability of about 300 pounds for each stage 61. While the bearing 60 produces a smaller bearing than the staged bearing 50 of FIG. 4, said bearing 60 has substantially greater deflection for a given operating pressure (or a substantially greater operating pressure for a given deflection).

Figure 6:
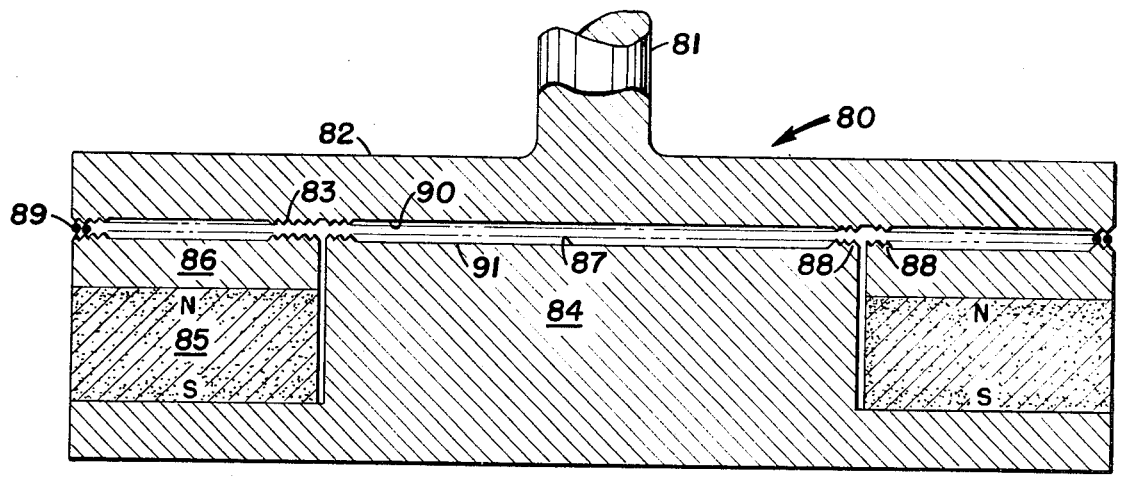
FIG. 6 is a sectional view of an operable magnetic fluid bearing.

FIG. 6 shows a typical magnetic fluid bearing 80 constructed according to the concepts previously detailed. Rotary shaft 81 is formed integrally with rotary annular thrust plate 82, the plate 82 having concentric annular bevels 83 near the outer edge thereof. Stationary annular thrust plate 84 has an annular ring magnet 85 attached thereto, the magnet 85 having an annular pole piece 86 attached to the face thereof. Both the pole piece 86 and inner surface 87 of the stationary plate 84 have bevels 88 formed thereon. The bevels 83 and 88 align and are disposed in oppositely-facing relation as has been previously described for other embodiments of the invention. The outer facing pairs of bevels 83 and 88 have magnetic fluid disposed therebetween and held by the ring magnet 85 to form magnetic seals 89. The volume between the plates 82 and 84 constitutes a sealed chamber 90 which contains a fluid 91, such as air. A bearing of the size actually shown for the bearing 80 would have a thrust load capability approaching 500 pounds and a radial load capability (due to magnetic flux concentrated between the plurality of opposing pairs of bevels 83 and 88) approaching one hundred pounds. The bearing 80 could operate indefinitely at these loading values.

Figure 7:
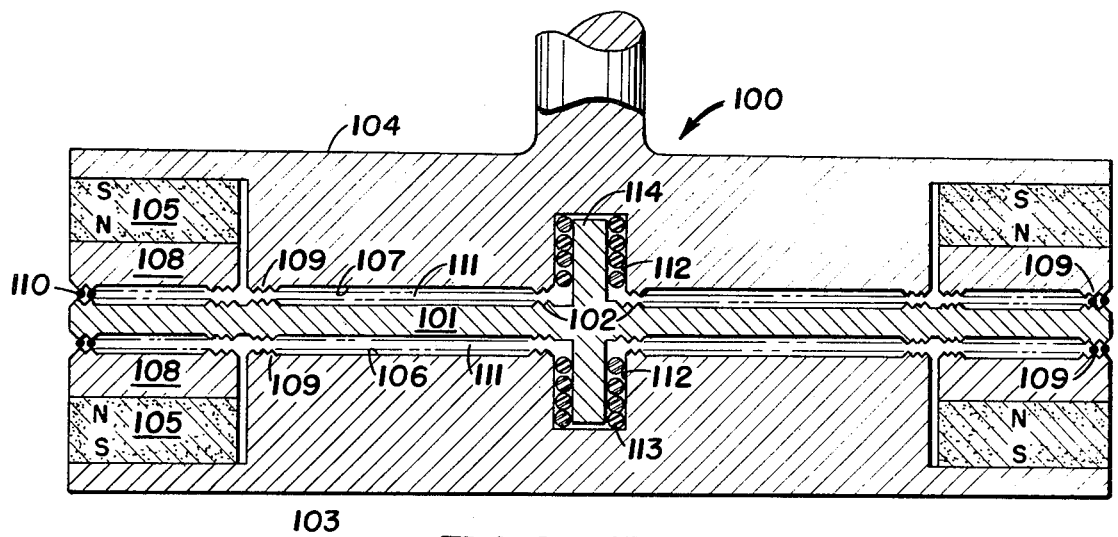
FIG. 7 is a sectional view of an embodiment of the invention having a "floating" annular center plate to provide higher speed capability.

The bearing of FIG. 7, shown generally at 100, has twice the operating speed of the bearing 80 due to the provision of a "floating" annular center plate 101. The plate 101 has raised concentric bevels 102 formed on both surfaces thereof. A stationary annular thrust plate 103 and a rotary annular thrust plate 104 have annular ring magnets 105 inset into their respective inner surfaces 106 and 107, annular pole pieces 108 being contiguous to the magnets 105 and extending therefrom to form a flush even surface with the respective inner surfaces of the plates. Both the inner surfaces 106 and 107 and the pole pieces 108 have concentric bevels 109 formed therein, the bevels 109 being aligned with and opposing the corresponding bevels 102 formed on the opposite surfaces of the plate 101. The bevels 109 on the inner surfaces 106 and 107 of the thrust plates 103 and 104 respectively are separated by a narrow spacing from the bevels 102 on either side of the plate 101, the spacings between the outer pairs of bevels 109 and 102 being filled with magnetic fluid which, under the influence of the respective ring magnets 105, form magnetic seals 110. Thus, two sealed chambers 111 are formed on either side of the center plate 101, said chambers 111 containing a fluid such as air. The plate 101 may be held between the plates 103 and 104 by means of an integral axial shaft 114 supported within axial bearing ports 112 formed in the plates 103 and 104. The ports 112 may hold ball bearings 113 to support the plate 101.

The bearing 100 may also be operated at lower speed to reduce frictional losses due to the "drag" of the magnetic seals 110, thus providing a "low drag" bearing. The drag loss of the seals 110 can be expressed by:

$$P_S = \frac{\pi}{4} \eta N \frac{\delta'}{\delta} D^3 \omega^2$$

where:

$P_S$ = Seal loss, dyne-cm./sec. $\left( \times \frac{1}{10^7 \times 746} = \text{horsepower} \right)$ $\eta$ = Absolute viscosity of seal fluid poises
$N$ = Number of seals
$\delta'/\delta$ = Ratio of width and height of seal cross section
$D$ = Seal diameter, cm
$\omega$ = Rotational speed, rad/sec The viscous drag of the fluid between the plates 101, 103, and 104 in the bearing is about two orders of magnitude less than the seal drag, while the magnetic drag is negligible. Assuming turbulent flow, the air drag can be approximated by the following relationship:

$$P_a = 3.51 \times 10^{-10} \rho^{0.5} r^4 \omega^{2.5} \mu^{0.5}$$

where:

$P_a$ = Air drag = dyne-cm/sec
$\rho$ = Gas density-slugs/ft$^3$
$r$ = Bearing radius-feet
$\omega$ = Rotational speed-rad/sec
$\mu$ = Dynamic viscosity of the gas-lb$_m$/ft-sec Thus, the minimum bearing drag is optimizable to a preferred seal diameter and number of center plates 101 for a given load and speed condition. For a particular bearing configuration, however, the bearing drag will not vary appreciably with load within the design range.

Figure 8:
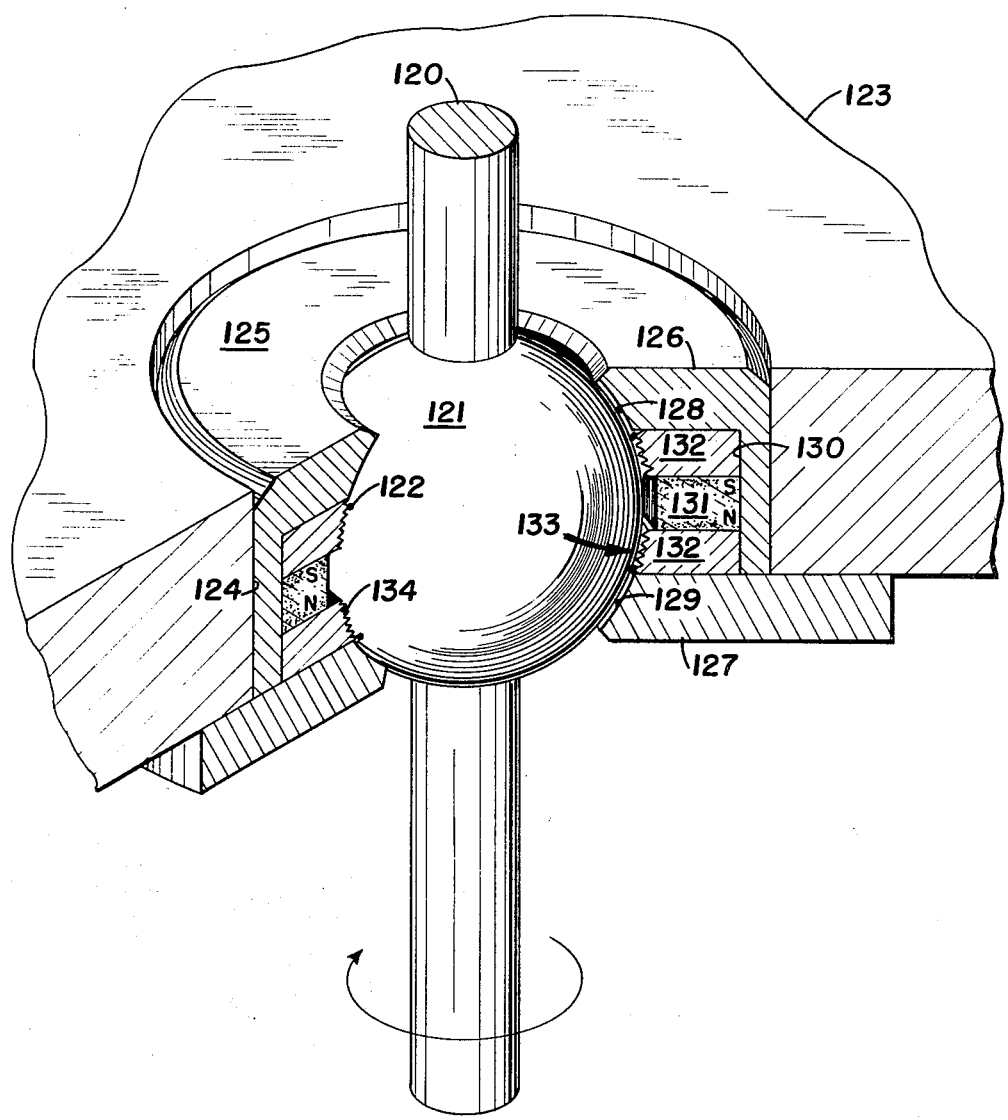
FIG. 8 is a perspective view in partial section of a modification of the invention which has universal capability.

FIG. 8 illustrates an application of the present invention wherein a universal movement of the rotating part of the bearing structure is desired. The configuration shown is also particularly useful when a "hard" vacuum exists on one side of the bearing. Referring to FIG. 8, a rotary shaft 120 is seen to have a spherical ball 121 formed integrally therewith, the shaft 120 being aligned along an axis of the ball 121. The shaft 120 may be disengageable from the ball 121 on either side thereof. The ball 121 is formed of magnetically permeable material to assist in accommodating magnetic seals 122 to be described. A stationary wall 123 has a circular opening 124 formed therein, the opening 124 receiving a race or housing 125 having spaced annular walls 126 and 127 projecting inwardly therefrom. The housing comprises a body 125a which includes a top wall 126. A bottom wall 127 is secured to the housing and closes the lower end thereof, said bottom wall being extended radially to define an anchoring flange for securing the ball in the housing in the opening 124. The ball 121 movably mounted in the housing, the walls 126 and 127 having annular bearing surfaces 128 and 129 respectively which follow the local contour of said ball. The surfaces 128 and 129 may have ball bearings (not shown) disposed therein to accommodate loadings encountered in particular applications. An annular recess 130 is defined by the walls 126 and 127 and has an annular ring magnet 131 located therein, the magnet 131 having annular pole pieces 132 disposed on either side thereof. The pole pieces 132 have annular bearing surfaces 133 which generally follow the local contour of the spherical ball 121. The surfaces 133 of the pole pieces 132 have concentrically offset annular bevels 134 extending toward the ball 121 and being spaced therefrom. Magnetic fluid is disposed in the narrow gaps formed between the ball 121 and the apices of the bevels 134, thereby forming the magnetic seals 122. For those applications requiring a hard vacuum on one side of the wall 123, the housing 125 may be sealed against the wall 123. The ball 121 and shaft 120 of the bearing structure of FIG. 8 is thus capable of both rotation and tilt while retaining seal integrity.

Figure 9:
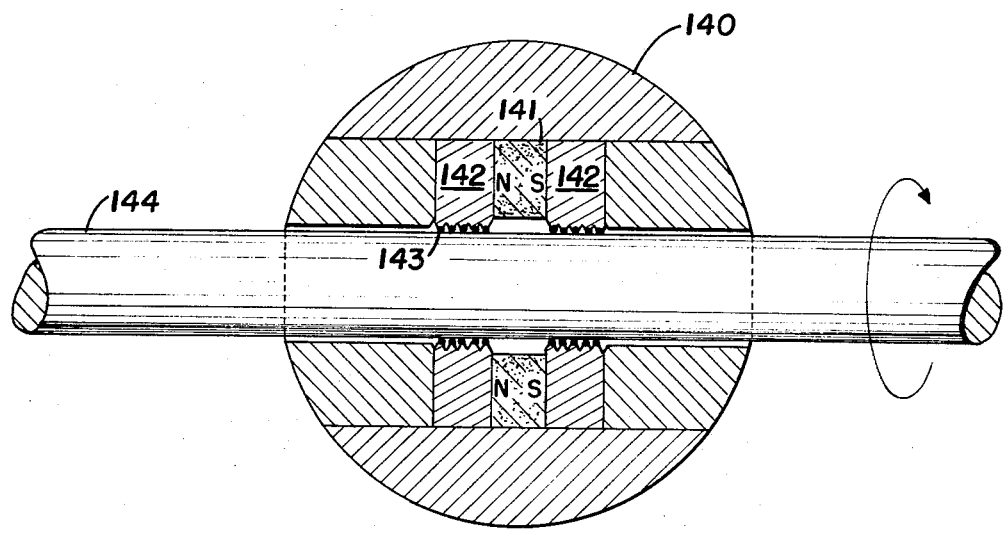
FIGS. 9a and 9b are sectional views of two embodiments of the universal bearing of FIG. 9, which embodiments each provide a linear movement capability.
Figure 9B:
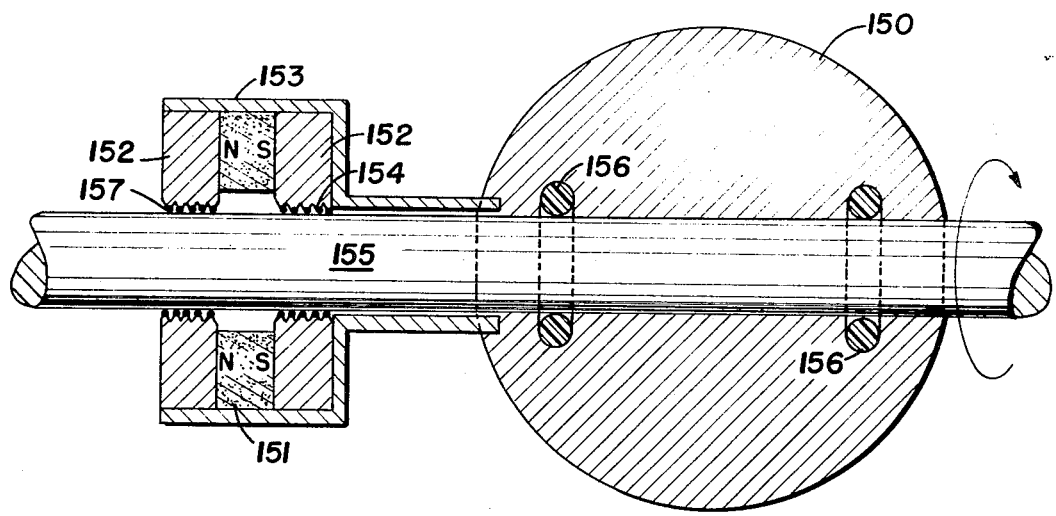

FIGS. 9a and 9b illustrate alternate embodiments of a universal bearing having linear capability. The ball 140 of FIG. 9a or the ball 150 of FIG. 9b is substituted for the spherical ball 121 in the structure of FIG. 8. Thus, in FIG. 9a, a ring magnet 141 acts through beveled pole pieces 142 to form seals 143 along a rotary shaft 144 extending through the ball 140. In FIG. 9b, a ring magnet 151 is held between pole pieces 152 by an annular housing 153. A series of annular bevels 154 formed in the inner peripheral surfaces of the pole pieces 152 hold, under the influence of the magnet 151, magnetic fluid 157 between the bevels 154 and a rotary shaft 155. The shaft 155 extends through the ball 150 and has a sealed connection therewith by O-ring seals 156. In the configurations shown in FIGS. 9a and 9b, the respective shafts 144 and 155 are rotated within the balls 140 and 150, the use of the balls 140 and 150 being restricted to angular motion. Linear reciprocal motions approaching an inch in magnitude may thus be accommodated.

Figure 10:
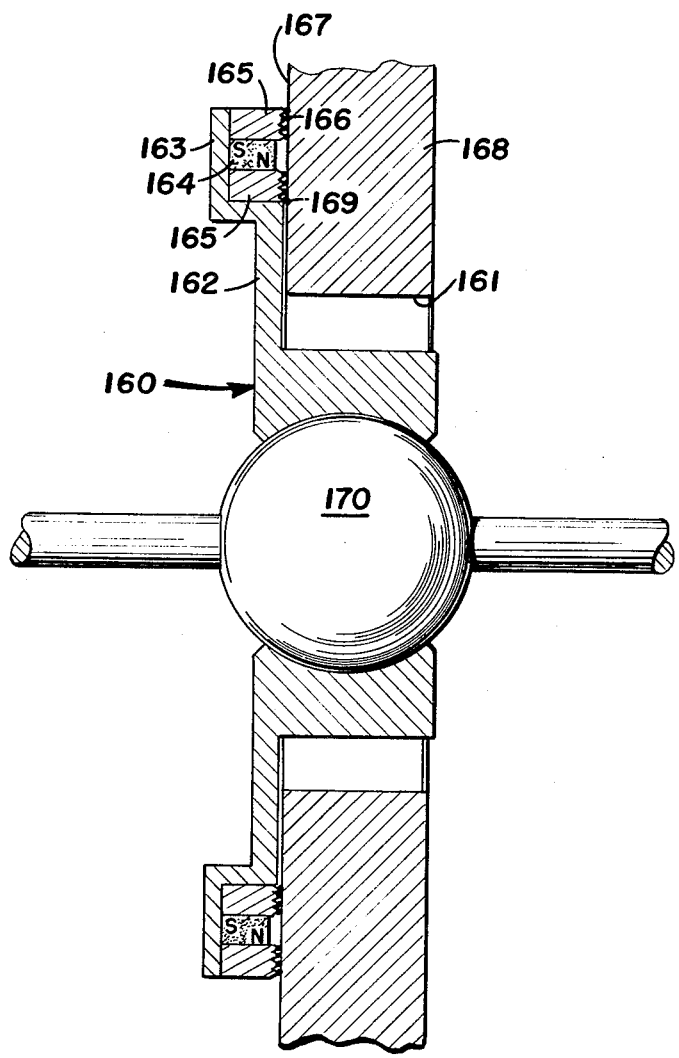
FIG. 10 is a partial section of an embodiment of the universal bearing of FIG. 9, which embodiment provides a lateral movement capability; and, FIG. 11 is a perspective view, in partial section, of a rotary surface having sealing as well as bearing capability.

FIG. 10 illustrates a universal bearing with lateral as well as rotary and tilting capability. The structure of FIG. 8 is essentially duplicated except that the race or housing 125 of FIG. 8 takes the form of housing 160, i.e., the housing 160 is free to rotate within an annular channel 161 formed in plate 168 The insert 160 has a flange 162 which has an annular L-shaped lip 163 formed along the outer perimeter thereof, the lip 163 housing an annular ring magnet 164. The ring magnet 164 is held between annular pole pieces 165 which have concentric annular bevels 166 disposed on the inner surfaces thereof. The bevels 166 extend toward outer wall 167 of a stationary plate 168 and are spaced therefrom. Magnetic fluid held between the bevels 166 and the wall 167 forms magnetic seals 169. The bearing of FIG. 10 could be further modified to provide a linear capability by substituting either of the balls 140 or 150 of FIGS. 9a or 9b respectively for ball 170, which ball 170 is mounted for universal movement in the housing 160.

Figure 11:
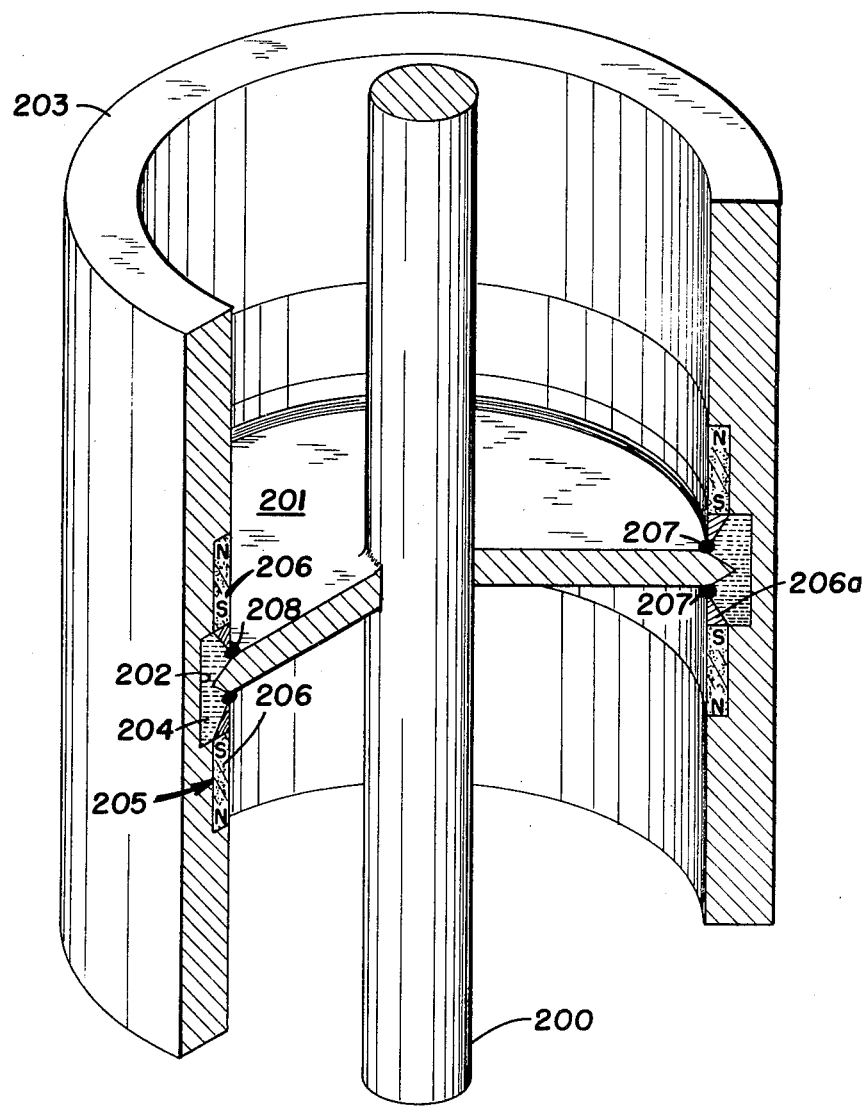

FIG. 11 illustrates a rotary structure related to the invention which essentially constitutes a seal having some bearing capability. A rotary shaft 200 is formed with an integral annular flange 201 which extends into an annular cavity 202 disposed in the inner surface of a stationary housing 203. The cavity 202 contains a fluid 204 which is retained by magnetic seals 205. The seals 205 are comprised of annular ring magnets 206 disposed on either side of the cavity 202, and pole pieces 206a tapering to annular bevels 207 near that portion of the flange 201 which extends into said cavity 202. Magnetic fluid 208 is held in the respective spaces between the bevels 207 and the flange 201 by the influence of the magnets 206. The rotary structure shown essentially comprises a seal which prevents leakage along the axis of rotation of the shaft 200.

Essentially, the present invention comprises the rotary bearing and sealing structure described hereinabove. However, the invention is not to be limited by the exact configurations shown, since extensive modification to the described structures is possible without departing from the intended scope of the invention. In particular, modification of the present rotary structures described may be necessary for those situations where non-magnetic materials are used to form the structural portions thereof. In such instances, modifications of the sealing structures produce bearing structures with undiminished capabilities.

I claim

1. In combination with a rotary member, a thrust bearing for restraining displacement of the rotary member along the axis of rotation thereof, the bearing comprising means defining a thrust surface rotatable with the rotary member, means defining a second thrust surface opposing said first-mentioned thrust surface, said surfaces having a space therebetween, magnetic means for concentrating magnetic flux along the perimeters of said thrust surfaces, magnetic fluid disposed along the perimeters of the said thrust surfaces, the fluid being held by the influence of the magnetic means, thereby sealing the space between said surfaces, and, a fluid held in the sealed space between said plates.

2. The bearing of claim 1 wherein the fluid is held under pressure in the sealed space spacing.

3. The bearing of claim 1, wherein said first-mentioned means comprises a first thrust plate mounted on the rotary member coaxially of and normal to the spin axis for rotation therewith;

said second-mentioned means comprises a second thrust plate normal to the spin axis and located in proximity to the first thrust plate and defining a spacing therebetween; and said magnetic means comprises concentric bevels located on the first thrust plate, concentric bevels located on the second thrust plate, the bevels facing each other, and a permanent magnet carried on at least one of the thrust plates for concentrating magnetic flux between the bevels;

said magnetic fluid being disposed between at least the outermost and innermost opposing pairs of bevels for sealing the spacing between the respective thrust plates and said second-mentioned fluid being held in the sealed spacing between the respective thrust plates and sealed therein by the magnetic fluid.

4. The bearing of claim 3 and further comprising a floating center plate disposed coaxially between the first thrust plate and the second thrust plate, the floating center plate being normal to the spin axis and located in proximity to both of the aforementioned thrust plates to define spacings on either side of said floating center plate;

concentric bevels located on the faces of the floating center plate, which said bevels face and oppose the bevels on the first thrust plate on one face thereof and face and oppose the bevels on the second thrust plate on the other face thereof; and magnetic fluid disposed between at least the outermost and innermost opposing pairs of bevels on one face of the floating center plate and bevels on the first thrust plate and between at least the outermost and innermost opposing pairs of bevels on the other face of the floating center plate and bevels on the second thrust plate; the fluid being held by the influence of the magnetic means to seal the respective spacings between the floating center plate and the thrust plates.

5. The thrust bearing of claim 3 and further comprising a plurality of first thrust plates mounted in spaced relation on the rotary member coaxially of and normal to its spin axis for rotation therewith, a plurality of second thrust plates disposed in mutually spaced relation and interdigitated in alternating relation to the first thrust plates, magnetic means for concentrating magnetic flux at the inner and outer perimeters of each of the plates, magnetic fluid disposed between said inner and outer perimeters of the plates, the fluid being held by the influence of the magnetic means for sealing the spacings between the plates, and a fluid held in the sealed spacings between said plates.

6. The thrust bearing of claim 1, wherein said first-mentioned means comprises a spherical ball mounted coaxially of and along the spin axis of the rotary member, and said second-mentioned means comprises a wall formed with an opening having a housing therein for receiving the spherical ball, the housing having inner surfaces contoured to and opposing a portion of the surface of the spherical ball and being spaced therefrom.

7. The thrust bearing of claim 6 wherein the rotary member extends through the spherical ball, the bearing further comprising magnetic means internal of the spherical ball for concentrating magnetic flux over the surface of the rotary member at points along said member, the rotary member and the magnetic means having an annular spacing therebetween, magnetic fluid disposed on the rotary member at the outermost points of flux concentration, for sealing the spacing, and a fluid held in the sealed spacing.

8. The bearing of claim 6, and further comprising a second housing connected to the spherical ball, said second housing having an opening receiving the rotary member therethrough, said second housing including magnetic means spaced from said rotary member and concentrating magnetic flux over the surface of said rotary member within said second housing, magnetic fluid disposed on the rotary member at the innermost and outermost perimeters of flux concentration for sealing the space between said magnetic means and the rotary member and a fluid held in the sealed space.

9. The bearing of claim 6, wherein the wall is formed with a channel therein, the housing being movable laterally within said channel, the housing further comprising an annular lip including magnetic means for concentrating magnetic flux over the surface of the wall at the inner and outer perimeters of said lip, the magnetic means and the wall having an annular spacing therebetween, magnetic fluid disposed over the surface of the wall at the inner and outer perimeters of the lip, thereby sealing the spacing defined by the magnetic means and the wall, and a fluid held in the sealed spacing.

10. The thrust bearing of claim 1, wherein said magnetic means concentrates magnetic flux on both sides of the first-mentioned means and wherein the second thrust surface has a cavity disposed therein, the cavity having a second fluid held therein by the sealing action of the magnetic fluid under the influence of the magnetic means, the first-mentioned means comprising a flanged member which extends into the cavity and contacts the second fluid held within the cavity.

11. A thrust bearing primarily for resisting thrust forces along the spin axis of a rotary member, comprising a first thrust plate mounted on the rotary member coaxially of and normal to the spin axis for rotation therewith, a second thrust plate normal to the spin axis and located in proximity to the first thrust plate and defining a spacing therebetween, concentric bevels located on the first thrust plate, the outermost of which bevels is disposed near the outer perimeter of the said plate, concentric bevels located on the second thrust plate which said bevels face and oppose the bevels on the first thrust plate, magnetic means for concentrating magnetic flux between the opposing bevels on the first thrust plate and second thrust plate respectively, magnetic fluid disposed between at least the outermost and innermost opposing pairs of bevels, and a fluid held under pressure in the spacing between said plates, which spacing is sealed by the magnetic fluid under the influence of the magnetic means.

* * * * *